Oct. 14, 1958     F. W. CUNNINGHAM     2,855,691

GEAR TESTER

Filed Nov. 24, 1954     3 Sheets-Sheet 1

INVENTOR
Frederick W. Cunningham
BY
ATTORNEYS

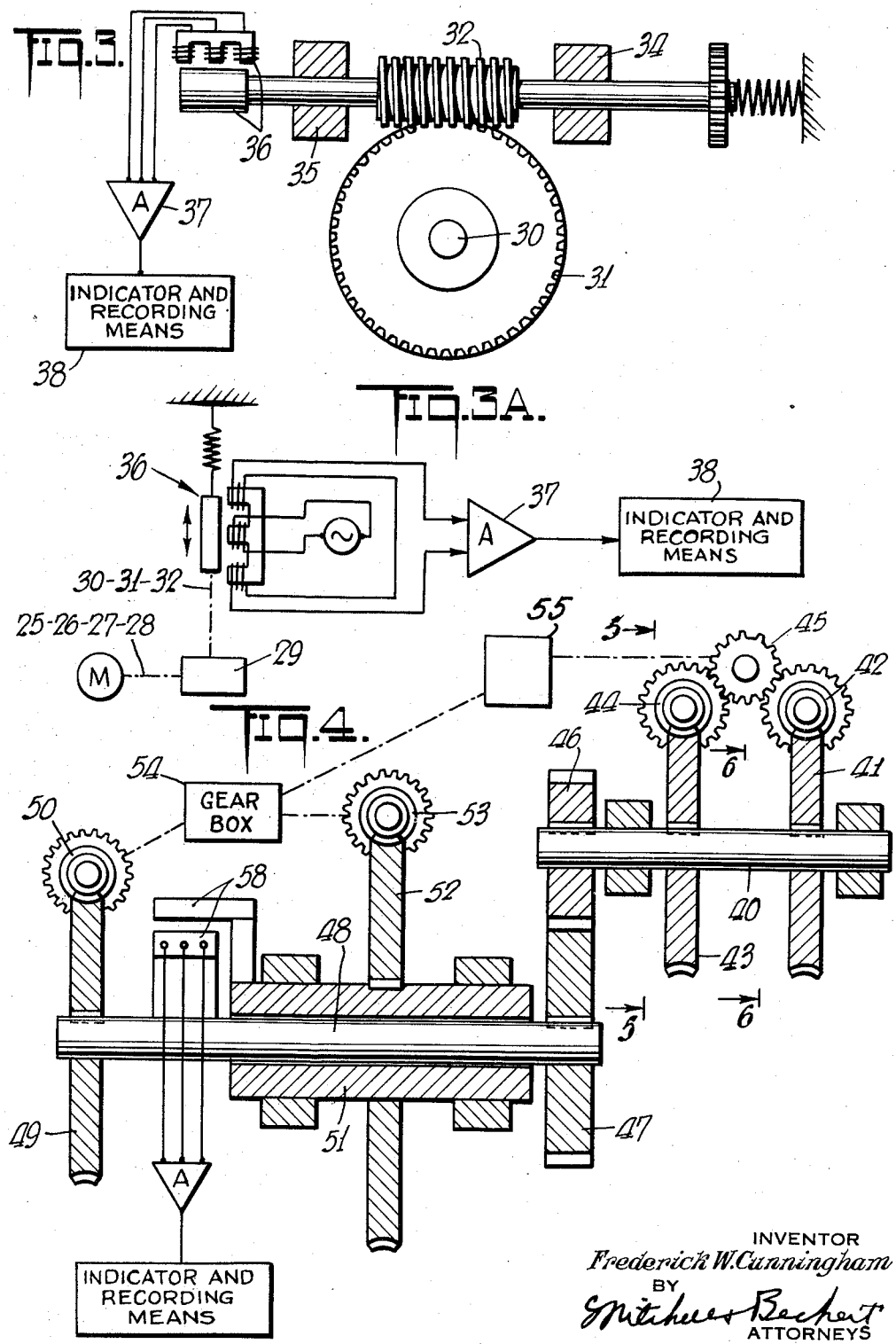

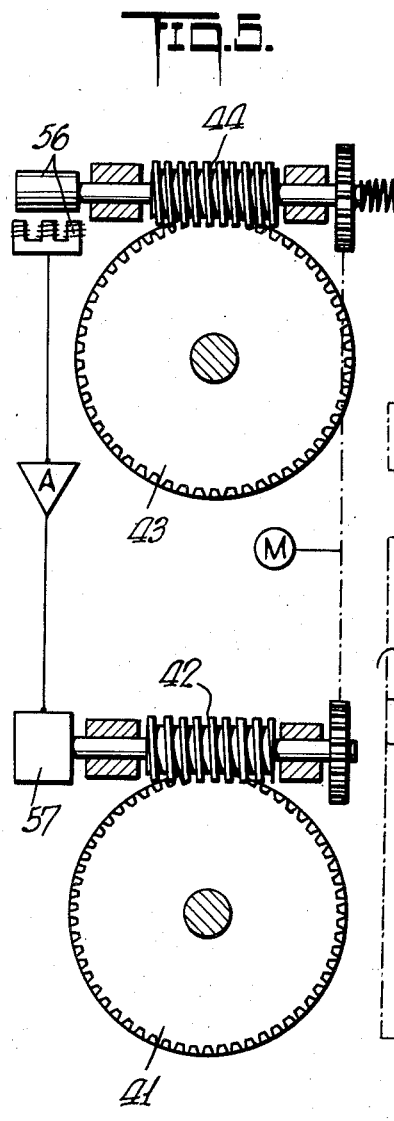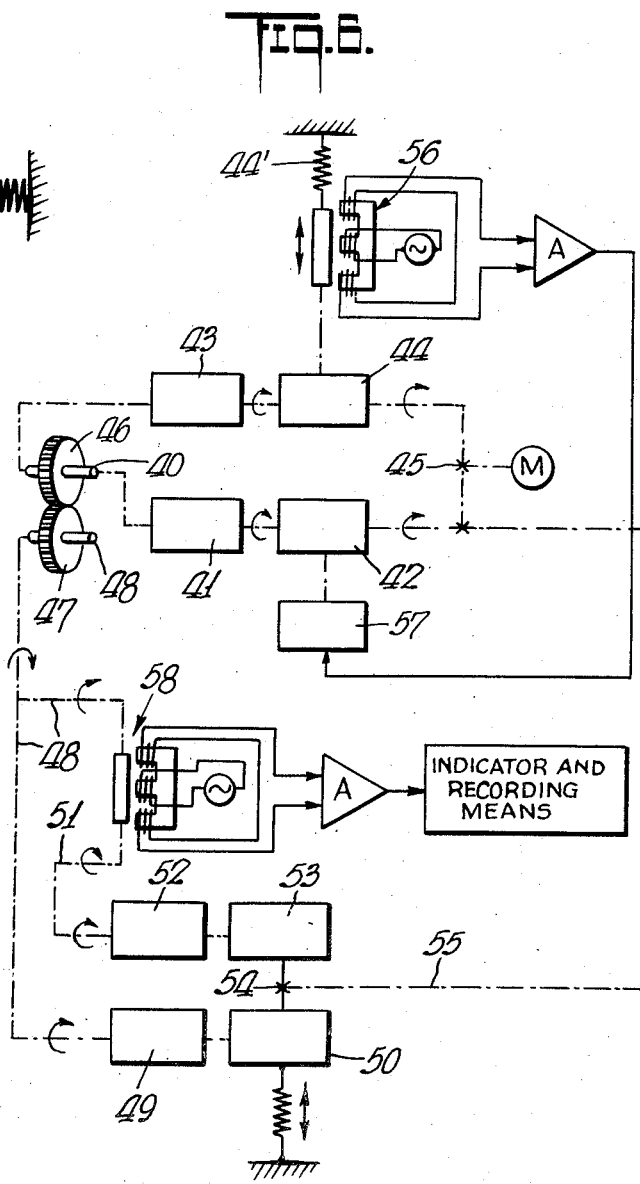

United States Patent Office 2,855,691
Patented Oct. 14, 1958

2,855,691

GEAR TESTER

Frederick W. Cunningham, Stamford, Conn.

Application November 24, 1954, Serial No. 470,888

5 Claims. (Cl. 33—179.5)

My invention relates to a method of and apparatus for testing gears and gear trains, and particularly for testing the accuracy of angular transmission of gears and trains.

Other methods have been devised for testing gears, but most of them fall short as tests of the accuracy of the angular transmission of gears or gear trains.

One usual testing device consists of a spindle carrying a gear of high accuracy, and a second spindle mounted for transverse movement toward and away from the first spindle and carrying a test gear meshing with the master gear on the first spindle. The two spindles are urged toward each other as by a spring and are held apart by the gears themselves. Errors in the test gear will permit the shafts to be moved toward each other or the shafts will be forced away from each other, and any variations in the shaft distances are usually considered as variations or errors in the test gear. The shaft positions are read or recorded and all the variations, due to whatever cause, are referred to as the composite error in the gears.

There are test devices for determining the actual error in the tooth form of a gear, but the labor involved in measuring every tooth of the gear at several places on each tooth is usually too great to justify extensive use of such devices.

It should be noted that the aforesaid methods of testing gears and others which have been proposed tell little or nothing as to the actual angular transmission characteristics of the test gear. Since gears and gear trains are designed to transmit angular motion, the known methods which do not actually measure the angular transmission characteristics are of limited value as actual tests.

My invention is based upon a comparison of the actual angular transmission characteristics of a test gear as compared with a gear, or train which might be considered theoretically correct, at least to the extent that the master gear or train is of much higher accuracy than the test gear itself.

It is an object of my invention, therefore, to provide an improved method of and apparatus for testing and observing or recording actual errors or irregularities in the angular transmission characteristics or properties of a gear or gear train.

Another object is to provide improved means for comparing the angular transmission characteristics of a pair of meshing gears, one of which is a high accuracy gear, or which may be termed a theoretically correct gear.

A further object is to provide a method of and apparatus for testing a gear or gears for angular transmission characteristics while under load.

Another object is to provide a method of and apparatus for testing gears and measuring, observing or recording errors or deviations from a certain standard in the angular transmission characteristics of a gear or gears.

Other objects and various features of novelty and invention will be pointed out or will become apparent.

In the drawings I have shown, diagrammatically, several forms of apparatus for carrying out my invention. In said drawings:

Fig. 3 is a sectional view, taken substantially in the plane of the line 3—3 of Fig. 2;

Fig. 3A is a diagram of a pick-up device applying the form shown in Fig. 3;

Fig. 4 is a view similar to Fig. 1, but illustrating a further modification wherein a gear or gears may be tested for angular transmission characteristics while under load;

Fig. 5 is a fragmentary composite sectional view, taken substantially in the planes of the lines 5—5 and 6—6 of Fig. 4 the parts shown in the two planes being displaced for clarity of illustration; and Fig. 6 is a diagram of pick-up means applicable to the form shown in Fig. 4.

Figure 1:
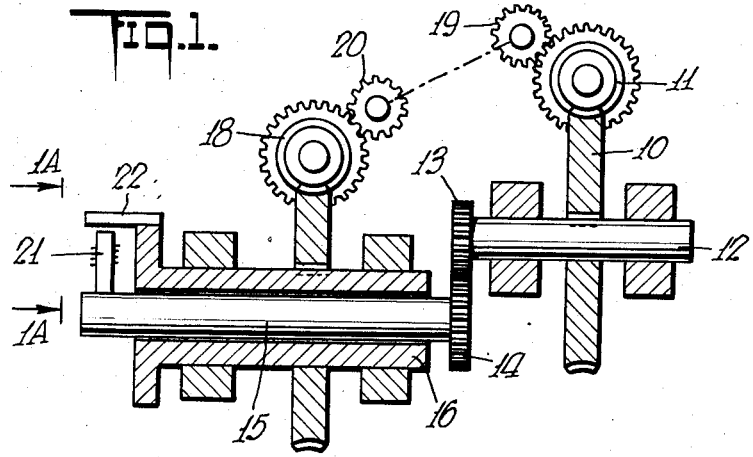
Fig. 1 is a diagrammatic or schematic view of gear testing apparatus for carrying out my invention.
Figure 1A:
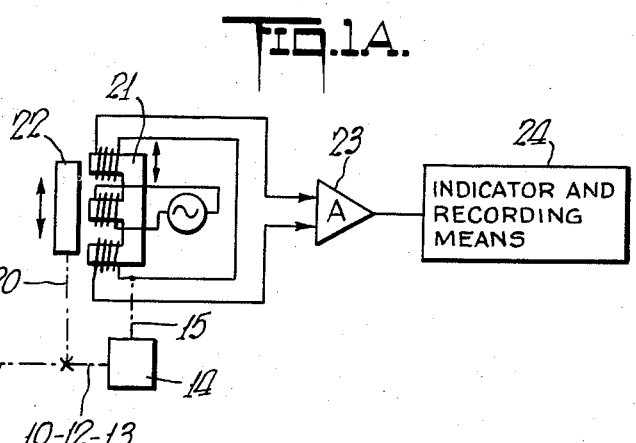
Fig. 1A is a diagram of a pick-up device viewed at 1A—1A.

In that form of the invention shown in Fig. 1, a test gear is tested by comparing its angular transmission characteristics with those which would be possessed by a gear if it were theoretically correct, and herein when I use the term "theoretically correct" or "accurate" in relation to a gear or gear train, I mean such a gear or train which is of very high accuracy compared with the accuracy of the test gear under consideration.

In that form shown in Fig. 1, there is a worm-wheel 10, operable by a worm 11, both of very high accuracy. The shaft 12, carrying the worm-wheel 10, carries a gear 13, which could be the test gear, but which is preferably a gear of very high precision, or theoretically correct in relation to the possibly inferior meshing gear 14 under test, which is mounted on a second shaft 15. The gears 13—14 are in mesh with each other as shown in the drawings, so that when the shaft 12 is rotated by the high accuracy worm and worm-wheel 10 and 11, the shaft 15 is driven by the two gears 13—14. Mounted for rotation coaxially with the shaft 15 is a third shaft 16, which is preferably driven by a second high accuracy worm wheel 17 and worm 18. The worms 11 and 18 are preferably geared together through a change gear box, as represented by the gear train, showing the two gears 19—20. Now, the gearing connecting the worms 11—18 is so proportioned that the first shaft 12 and the third shaft 16 are rotated by the highly accurate worms and worm wheels at speeds in the inverse ratio of the diameters of the two meshing gears 13—14, one of which gears, as stated, is the test gear.

The shaft 15, which is mounted for rotation coaxially with the shaft 16, is driven directly by the gears 13—14. The irregularity in the rotation of the gears 13—14 is observed or measured by the relative rotation of the shafts 15—16, and any means, electrical, mechanical, or otherwise, for detecting fine relative rotation between these two shafts, may be employed to indicate or record the relative rotation, which relative rotation is a measure of the inaccuracy of the test gear 14.

In the form illustrated, I employ an E-magnet device 21—22, carried by the shafts 15—16 and constituting an accurate pick-up device, to detect any relative rotation between the shafts of the gears 15—16. The pick-up effect may be amplified at 23, and read on a voltmeter or recorder 24, which will permit observation of or actual recording of any slight variations in the angular rotation of the shafts 15—16, and therefore record the errors in the test gear 14.

Figure 2:
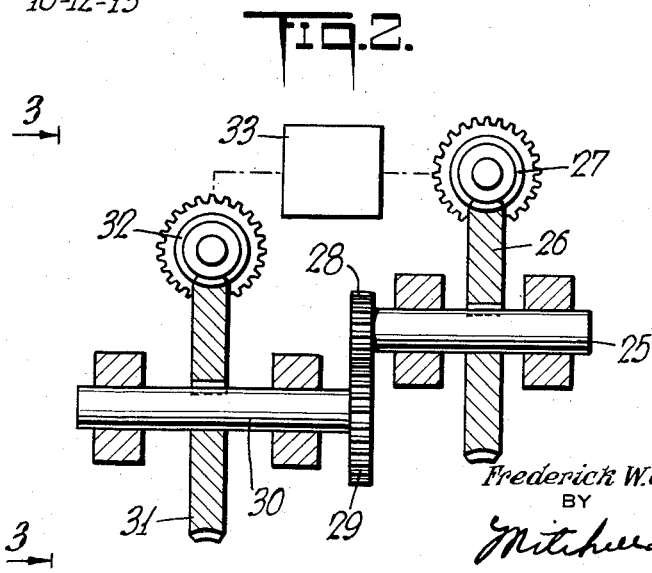
Fig. 2 is a view similar to Fig. 1, but illustrating a modification, which may be termed a simplification of the form illustrated in Fig. 1.

In that form of the invention shown in Fig. 2, a test gear, as in the previous form, is tested against a theoretically correct gear, that is, a gear of high accuracy, as previously explained.

In the form shown in Fig. 2, the rotatable shaft 25 is rotated by a theoretically correct or high accuracy worm wheel 26 and worm 27. The shaft 25 fixedly carries thereon a gear 28, meshing with a gear 29, one of these gears being a theoretically correct or high accuracy master gear, which may be the gear 28, and the other in this case, the gear 29, being the gear under test. The test gear 29 is carried by a rotatable shaft 30, which carries a precision worm wheel 31 driven by a worm 32, these elements being theoretically correct or of high accuracy, as heretofore described. The worms 27—32 are geared together, as through a gear box 33, so that the worm 32 is driven by the worm 27 and at a speed in inverse ratio of the diameters of the gears 28—29. It will be seen that the gears 28—29 drive the shaft 30, and at the same time the worm 32, which meshes with the driven worm 31, is rotated by the worm 27. Therefore, if there is any variation in the rotation of the shaft 30 by the gears 28—29 over that normally produced by the worm 32 and worm wheel 31 as driven by the worm 27, there must be some lost motion arrangement to permit the shaft 30 to be driven by two different driving sources, which may not be driving at exactly the same rate. In the form illustrated, the worm 32 is mounted for axial sliding as well as rotating movement in the bearings 34—35, so that any variation between the driving of the shaft 30 by the worm and worm wheel and by the gears 28—29 will be taken up by endwise movement of the worm 32, as will be clear from Fig. 3. Any suitable pick-up mechanism, whether mechanical, electrical, or otherwise, may be provided for indicating the extent of longitudinal movement of the worm 32, and the extent of such longitudinal movement is a measure of the difference in rotation produced on the shaft 30 by the gears 28—29 and by the worm and worm wheel 31—32. In order to record this endwise movement of the worm, I employ electrical pick-up means, which may consist of an E-magnet device 36, one part of which is carried by the worm 32 and the other part being fixed. This E-magnet device constitutes a very accurate pick-up, and changes may be amplified by the amplifier 37 and the results either observed upon the voltmeter or recorded by the recorder 38, as will be understood. Therefore, any variation in the rotation of the shaft 30 produced by the gears 28—29 and the rotation which would be produced by the driving worm 37 and the driven worm 32 will be observed or recorded by a voltmeter or recorder 38, so that any variation in the position of the worm 32 will act as a direct measure of the irregularities in the angular transmission characteristics of the test gear 29.

In that form shown in Figs. 4–6, I have provided a method of and means for testing a gear under load, so that any variations which might fail to show up under no load, but which would show up under load, may be readily observed or recorded. Of course, in those forms shown in Figs. 1 to 3, the test gear and the master gear could be put under load, but running under load would tend to wear and to impair the accuracy of the very high precision costly worms and worm wheels. As illustrated, there is a rotatable shaft 40 on which I may mount a worm wheel 41, which may be of inferior accuracy, and which may be driven by a worm 42 of equally inferior accuracy. On this same shaft 40, or operable therewith, I mount a high precision worm wheel 43 and an equally high precision worm 44. These worms 42—44 are preferably geared together, as by means of an idler or any suitable gear train 45, and if the worm gears be of the same size, they are designed to rotate substantially together. The shaft 40 carries a gear 46, meshing with a gear 47 mounted on a rotatable shaft 48. The gears 46—47 mesh with each other and both may be put under load, even though one of the gears, such as 46, is a high precision gear, while 47 is a test gear. The rotatable shaft 48, which, as stated, carries the test gear 47, preferably carries a worm wheel 49, driven by a worm 50, both of which may be of inferior accuracy, and the worm 50 is loaded by spring means or otherwise so as to put a constant operating load on the gears 46—47. I employ also a third shaft 51, which is mounted on bearings co-axially with the shaft 48 and is driven by a worm wheel 52 and worm 53. The worm 52 and worm wheel 53 are high precision gears. The worms 50—53 are preferably geared together through suitable gears, or a gear box 54, and through the gear box 54 and a second gear box 55, the common drive gear 45 drives the worms 50—53.

In order to keep any substantial load or pressure off of the precision worm wheel 43 and worm 44, I do not drive the shaft 40 by the worm 44 and worm 43. Instead, I drive the shaft 40 by the worm wheel 41 and worm 42 of inferior accuracy, but rotated at such a speed and at such variations in speed as would drive the shaft as it would be driven by a proper high accuracy drive by the worm 44 and worm wheel 43. This may be accomplished as follows:

The precision worm 44, which normally drives the worm wheel 43, rotates with the worm 42, through the idler gear 45, as heretofore explained. Since the worm 42 and worm wheel 41 are of inferior accuracy, it is not to be expected that the worm 43 would rotate as it normally would under the influence of the worm 44, so I preferably mount the worm 44 for endwise movement so that, if the drive by the inferior worm wheel 41 differs from the normal drive by the high precision worm 43, the high precision worm 44 will be moved axially. This movement axially may be used in conjunction with means such as an E-magnet, or other pick-up device 56, to affect the drive worm 42. Thus, any axial movement of the worm 44 will be picked up, amplified and used to actuate a servomotor 57 to drive the inaccurate worm 42 in one or the other direction until the worm 44 is brought back to its normal or initial position. Thus, the worm and worm wheel 41—42 actually driving the shaft 40 will be caused to drive the latter at exactly the speed that the shaft would be driven by the worm 43 and precision worm 44. It will be seen, therefore, that the precision worm 43 and worm 44 take none of the severe load required for driving the gears 46—47 under load, and, on the contrary, the inferior worm and worm wheel 42—41 actually drive the shaft 40, but at a uniform speed at which it would be driven if driven by the high precision worm wheel 43 and worm 44. Because of the change gear box or boxes 54—55, the worm wheel 52 is driven at a speed in relation to the speed of the high precision worm wheel 43 in inverse ratio of the diameters of the gears 46—47. Therefore, any relative rotation of the second shaft 48 and the third shaft 51 will be a measure of the inaccuracy of the test gear 47. In order to observe or record any such differences in rotation, I may provide an E-magnet or similar pick-up devices 58, one part of which is carried by the second shaft 48, and the other part of which is carried by the shaft 51. Therefore, any variation between the rotation of those shafts 48—51 will be picked up by the pick-up device and amplified as shown on a voltmeter or recorded on an actual recorder. Any such variation in the rotation of those two shafts will be a measure of the actual error of angular transmission of the test gear 47.

In all of the forms referred to, it is desirable, and in some cases necessary, to provide anti-back lash devices, which may be spring loads or otherwise, so as to eliminate back lash for greater accuracy.

It will be clear that by operating the drive worms in one direction certain variations will be recorded or observed, and by operating the same in the opposite direction the zones of irregularity will be quite accurately indicated.

The test mechanism itself may be tested by aligning the driving and driven shafts and coupling the same together. Any variations will then be detected and can be corrected or compensated for in the testing of actual gears. Of course, the driven and driving shafts may be connected together by a coupling at various phase angles, so as to avoid the possibility of compensating errors.

It will, of course, be observed also that, in testing gears, the irregular spots on test gears may be quite accurately marked and the gears may be connected at various phase angles for checking the actual positions of irregular angular transmission.

I have illustrated and described methods and apparatus for testing the angular rotation characteristics or capabilities of spur gears, but it will be observed that trains of gears, rather than individual gears, may be tested by the methods described, and that bevel gears or bevel gear trains may be tested by simply putting the shafts of the bevel gears at the correct angle and connecting them to the driving and driven units, as heretofore described.

In actual use, it will be convenient to provide individual longitudinal adjustment and positioning of the various worms to facilitate arrival at zero or starting points before or when tests begin.

It will also be desirable to mount the driven or driving unit so that it may be moved transversely and returned transversely to its original position. Many other mechanical refinements may be made.

While I have set forth several forms of apparatus for carrying out the method, it is to be understood that various changes and modifications may be made within the scope of the invention as defined in the appended claims.

I claim:

1. In a gear tester for testing the accuracy of a gear, a first shaft, a first gear rotatable with said first shaft, a second shaft, a second gear rotatable with said second shaft, said gears meshing with each other whereby upon rotation one shaft drives the other at an angular speed in the inverse ratio of the diameters of the respective gears, means of high accuracy and independent of said gears for tending to rotate both shafts at speeds in the inverse ratio of the diameters of the gears carried thereby, the means of high accuracy for tending to rotate at least one of said shafts comprising a high accuracy worm and worm wheel, said worm being mounted for axial movement, and indicating means for indicating the extent of axial movement of said worm to indicate the measure of the relative angular rotative tendency of shafts due to said gears and to said means of high accuracy tending to rotate said shafts.

2. In a gear tester for testing the accuracy of a gear under load, a first shaft, a first gear rotatable therewith, a second shaft, a second gear rotatable therewith, said gears being in mesh with each other and one being a test gear and the other a gear of high accuracy, whereby said shafts will rotate at speeds in the inverse ratio of the diameters of said gears, a high precision drive means rotatable with said first shaft, a low precision drive means on said first shaft for driving the latter, means for operating said low precision drive means to drive the said first shaft at a speed determined by said high precision drive means, a third shaft co-axial with said second shaft, high precision drive means for driving said third shaft at speeds in the inverse ratio of the diameters of said test and high accuracy gears aforesaid, means for braking said second shaft to put said test and high accuracy gears under load, indicating means operable by said second and third shafts indicating the relative angular rotation of said second and third shafts.

3. In a gear tester for testing the accuracy of a gear under load, a first shaft, a first gear rotatable therewith, a second shaft, a second gear rotatable therewith, said gears being in mesh with each other and one being a test gear and the other a gear of high accuracy, whereby said shafts will rotate at speeds in the inverse ratio of the diameters of said gears, a low precision drive means for driving said first shaft, a high accuracy worm and worm wheel drive on said first shaft, said worm being movable axially to prevent any heavy driving load on said precision worm wheel and worm, means controlled by said high precision worm for acting on said low precision drive means to drive said first shaft at the normal speed of said high precision worm, a third shaft, high precision means for driving said third shaft at speeds in inverse ratio of the diameters of said test gear and high precision meshing gear, indicating means carried by said second and third shafts for indicating the relative angular rotation of said second and third shafts, and means for loading said second shaft to maintain said test and meshing precision gears under load.

4. In a gear tester for testing the accuracy of a gear, a first shaft, a second shaft, gears on said first and second shafts and meshing with each other, one of said gears being a test gear and the other a high accuracy gear, a third shaft substantially coaxial with said second shaft, worm gear drive means driving said first shaft, a second and separate worm gear drive means driving said third shaft, said first and second worm gear drive means being positively connected by gears and driven from a common power source in a ratio to drive said first and third shafts in the inverse ratio of the nominal pitch diameters of said first and second gears, said second shaft being driven by said first shaft and said first and second meshing gear in the inverse ratio of the nominal pitch diameters of said first and second gears, and means for indicating the relative angular rotation of said coaxial second and third shafts.

5. In a gear tester, a first shaft, a second shaft, gears on said first and second shafts and meshing with each other, one of said gears being a test gear and the other a high accuracy master gear, a third shaft, a first worm wheel on said first shaft for driving the same, a second and separate worm wheel on said third shaft for driving the same, gear means interconnecting said worm wheels, means for driving said worm wheels through said interconnecting means at speeds to rotate said first and third shafts at speeds in the inverse ratio of the nominal pitch diameters of said first and second gears, said second shaft being operated by said first shaft and said two meshing gears so as to cause said first and second shafts to rotate at speeds in the inverse ratio of the nominal pitch diameters of said first and second gears, and means for indicating the relative angular rotation of said second and third shafts.

References Cited in the file of this patent

UNITED STATES PATENTS

| 2,514,716 | Muller | July 11, 1950 |
| 2,539,239 | Ernst | Jan. 23, 1951 |
| 2,641,088 | Wilcox | June 9, 1953 |
| 2,687,576 | Mahr | Aug. 31, 1954 |

FOREIGN PATENTS

| 95,678 | Switzerland | Aug. 1, 1922 |